Patented July 11, 1933

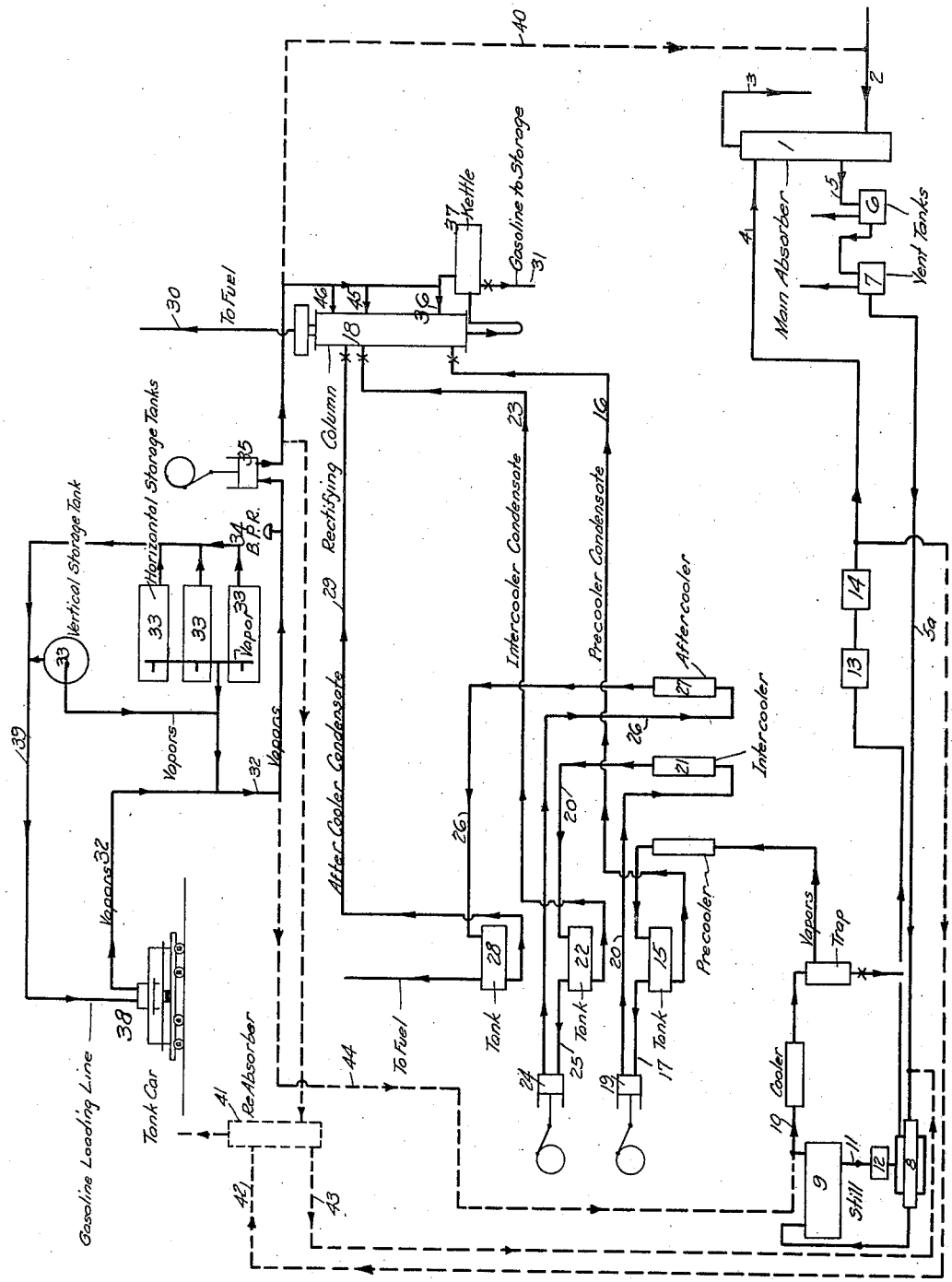

1,917,899

UNITED STATES PATENT OFFICE

RALPH NEWELL PARKS, OF CHARLESTON, WEST VIRGINIA, ASSIGNOR TO COLUMBIA OIL AND GASOLINE CORPORATION, OF NEW YORK, N. Y., A CORPORATION OF DELAWARE

RECOVERY OF NATURAL GASOLINE

Application filed October 23, 1930. Serial No. 490,613.

This invention relates to the recovery of liquid material from vapors arising from storage, handling and loading of tank cars with natural gasoline and other volatile liquids, as well as vapors arising from analogous causes and similar material. The vapors so arising are not efficiently recovered as liquid by the methods now in use.

The object of my invention is to recover as liquid a large part of such vapors as are "lost" in the handling, storage, and loading of natural gasoline and similar materials and I do this efficiently, with little cost of operation, and with little additional equipment other than that which is normally installed for the normal operation of the plant.

My invention is especially applicable to plants recovering "natural gasoline" from natural gas or refinery vapors. Three methods are, in general, used in such "natural gasoline" recovery plants. These methods are the compression method, the solid adsorption method and the liquid absorption method. The last of these three methods is the one in most common use, and my description and drawing show the application of my invention to this method of "natural gasoline" recovery, but I do not limit my invention to its application with a liquid absorption "natural gasoline" recovery plant as it is equally adaptable to other methods.

It has long been the practice to collect the vapors resulting from the handling, storage, and loading of natural gasoline and several methods are in use in the attempt to recover these vapors and return them to the liquid phase.

One method of such attempted recovery involves the mixing of the vapors with these gases from which the "natural gasoline" is being extracted. A second method involves the use of an auxiliary absorber thru which the vapors to be recovered are passed. A third method involves the mixing of the vapors to be recovered with the vapors of the "natural gasoline" leaving the still of the absorption plant. These methods will be described more fully later. However, I desire to point out here that by such methods the recovery of liquid from such vapors is only about 10% of the liquid equivalent of the vapors as shown by plant records extending over a period of several years. By the application of my invention, I have found from similar plant records that the recovery of liquid from the vapors arising from the handling, storage, and loading of natural gasoline amounts to approximately 60% of the liquid equivalent of such vapors. Thus by the application of my invention I obtain a recovery of six times as great as the recoveries attained by the methods now commonly used.

"Natural gasoline" as commonly produced contains undesirable fractions of high volatility and is too "wild" for use in the arts. To overcome this objection these "wild" components are removed from the "natural gasoline". The method now commonly used for such removal is the process of fractionation in a "stabilizer" or fractionating column. My method of recovering vapors involves the use of such fractionating column as will be readily seen from the following description.

In the accompanying diagram, 1 is an oil absorber to which the gas from which the "natural gasoline" is to be removed enters by pipe 2 and the "stripped" gas leaves by pipe 3. Fresh cool oil enters the absorber by pipe 4 and leaves by pipe 5 with its content of absorbed "natural gasoline." This oil after passing thru vent tanks 6 and 7 enters the heat exchanger 8 by pipe 5a from which it passes to the still 9 where the "natural gasoline" is removed as vapor thru the pipe 10. The oil after the removal of the gasoline vapors leaves the still by pipe 11, and is then pumped by pump 12 thru the heat exchanger 8 and cooler 13 and enters pump 14 from which it is again delivered to pipe 4 and absorber 1.

The vapors leaving the still by pipe 10 after being cooled enter the tank 15 where such liquid as has condensed in the cooling is separated from the vapors and is passed by pipe 16 to the fractionating column 18. The vapors from tank 15 enter the compressor cylinder 19 through pipe 17. After compression the vapors pass by pipe 20 through cooler 21 to tank 22. Here further condensate is removed and passed to the fractionating column 18 by pipe 23. The vapors from tank 22 enter the compressor cylinder 24 by pipe 25 and after being compressed pass through pipe 26 and cooler 27 to tank 28. Here further condensate is removed thru pipe 29 to the fractionating column 18. In the fractionating column the undesired constituents are removed from the various liquids entering the column by pipes 16, 23 and 29 and these undesired constituents leave the column by pipe 30. The marketable "natural gasoline" leaves the column by pipe 31.

The foregoing detailed description covers only the recovery of "natural gasoline" by the liquid absorption method. It is necessary for a clear understanding of my process of recovering vapors due to handling, storage and loading as differentiated from the methods now used for this same purpose. I will now describe these common methods of recovering vapors due to handling, storage and loading and will then clearly show wherein my method differs from the common pactices. In the accompanying illustration those features of these practices which do not form a part of my method are shown by dotted lines.

In the diagram, 38 represents a tank car being loaded with gasoline from the storage tanks 33 transported through pipe 39. The vapors arising from the loading of the tank car 38 and the storage tanks 33 are shown as collected in pipe 32.

As has been stated one common method of recovering the loading and storage vapors involves mixing these vapors with the gas from which the gasoline is to be extracted. In this method the vapors in line 32 pass thru the back pressure regulator 34 to the compressor cylinder 35 where their pressure is raised sufficiently to force them thru pipe 40 into the gas line 2, where they mix with the inlet gas to the absorber 1 and are handled as has been previously described.

A second common method as has been stated involves the use of an auxiliary absorber. In this method the vapors from pipe 32 enter the auxiliary absorber 41 thru back pressure regulator 34 and compressor 35. Oil from pump 14 enters the absorber by pipe 42 and after absorbing some of the vapors leaves by pipe 43. This oil enters the pipe 5a from which it is conveyed to the heat exchanger 8 and further treatment is by the method which has been described.

A third common method as has been stated involves the mixing of the vapors to be recovered with the vapors leaving the still of the gasoline recovery plant. In this method the vapors in pipe 32 are conveyed by pipe 44 and enter the pipe 10 from the still 9. Here they mix with the vapor leaving the still and are handled with these vapors in the manner already described.

My method differs from these common methods in that by my method the vapors from pipe 32 pass directly through the back pressure regulator 34 and the compressor cylinder 35 to the fractionating column 18, rather than passing through a large part of the gasoline recovery plant with other gas and vapors as is done in the methods now commonly used. The back pressure regulator 34 serves to prevent the compressor 35 pulling a vacuum on the tanks 33 or the car 38. The compressor 35 serves to raise the pressure of the vapors an amount sufficient to force them into the fractionating column 18 against the pressure obtaining in the column. The vapors may enter the fractionating column 18 by pipes 36 or 45 or they may enter the kettle 37. In some cases it may be desirable to cool the vapors leaving compressor 35 and condense a part of them before entering the column 18. In such instance the condensate should be led to the column separately from the uncondensed vapors and I would prefer that such condensate enter the column by a connection such as 45 or that in certain instances it might enter the kettle 37 depending upon the pressure at which the column is operated and that the uncondensed vapors enter the column at a higher point such as connection 46, or in certain instances these vapors may not enter the column and may be used for fuel or other purposes without further attempt to recover liquids therefrom.

Having fully described my invention, it will be apparent to one skilled in the art that my method is subject to some variation without departing from the spirit of my invention and also that my invention may be applied to plants using other means of recovery than the liquid absorption method.

In my claims where I use the term "gasoline" I include natural gasoline or other volatile liquids to which my invention is applicable, and where I use the term "fractionating column" I include the kettle as well as the column proper. Also in my claims where I use the term "vapors arising from the handling of gasoline" I include the vapors arising from storage and the vapors arising from the loading of cars, and analogous vapors or combinations of these. However as my invention pertains to the recovery of vapors from finished natural gasoline, which would otherwise be lost while the gasoline is in storage tanks or is being taken from one storage tank to another, or is being loaded into tank cars or drums, it does not relate to the treatment of vapors arising from gasoline in stages of manufacture. Moreover, I do not propose to separate high boiling hydrocarbons from low boiling hydrocarbons and I do not claim as my own the method of recovering gasoline vapors while the gasoline is in the process of manufacture.

What I claim is:

1. The method of recovering as liquid the gasoline vapors arising from storage receptacles containing finished gasoline, which comprises collecting said vapors, introducing them in the vapor phase into a rectifying column of a system in which gasoline is recovered from hydrocarbon gas, condensing the major portion of said vapors in said column, and collecting the resulting liquid.

2. The method of recovering as liquid the gasoline vapors arising from storage receptacles containing finished gasoline, which comprises collecting said vapors, compressing said vapors, introducing the compressed vapors while in the vapor phase into a rectifying column of a system in which gasoline is recovered from hydrocarbon gas, condensing the major portion of said vapors in said column, and collecting the resulting liquid.

3. The method of recovering as liquid the gasoline vapors arising from storage receptacles containing finished gasoline, which comprises collecting said vapors, compressing said vapors, cooling said compressed vapors whereby a portion of said vapors is condensed, introducing the uncondensed portion of the vapors into a rectifying column of a system in which gasoline is recovered from hydrocarbon gas, condensing the major portion of said uncondensed vapors in said column, and collecting the resulting liquid.

RALPH NEWELL PARKS.